United States Patent [19]

Kendall

[11] Patent Number: 5,052,844
[45] Date of Patent: Oct. 1, 1991

[54] BALL JOINT WITH DYNAMIC PRELOAD ADJUSTMENT

[75] Inventor: Rodney A. Kendall, Ridgefield, Conn.

[73] Assignee: International Business Machines Corporation, Armonk, N.Y.

[21] Appl. No.: 516,658

[22] Filed: Apr. 30, 1990

[51] Int. Cl.⁵ .............................................. B25G 3/00
[52] U.S. Cl. ..................................... 403/27; 403/142; 403/141
[58] Field of Search ................. 403/90, 137, 142, 123, 403/124, 144, 76, 126, 141, 27

[56] References Cited

U.S. PATENT DOCUMENTS 852,872  5/1907  Collins .............................. 403/90 X
2,242,215  5/1941  Johnson ............................... 403/141

FOREIGN PATENT DOCUMENTS 292915  12/1987  Japan ..................................... 403/27

Primary Examiner—Andrew V. Kundrat
Attorney, Agent, or Firm—Graham S. Jones, II

[57] ABSTRACT

A ball joint can dynamically alter the preload between the cones and the ball of the ball joint to desired levels. When the stage or other device is in motion, the preload can be reduced to provide low friction and wear. When the stage or other device is not in motion, then the preload can be increased to provide zero backlash and high stiffness. The ball-type pivot joint with dynamic preload adjustment includes a ball and a pair of cones which are dynamically preloaded by servo (feedback) control of a preload actuator. Alternate designs are limited by manufacturing and assembly tolerances as well as wear of bearing surfaces or are subject to change due to thermal fluctuations. A flexible member provides flexure of the bearing members in response to the preload actuator.

6 Claims, 1 Drawing Sheet

BALL JOINT WITH DYNAMIC PRELOAD ADJUSTMENT

BACKGROUND OF THE INVENTION

1) Field of the Invention

This invention is directed to a ball joint with a preload and more particularly a ball joint providing a high degree of precision of movement and suitable for drive mechanisms and the like.

CROSS REFERENCE TO RELATED APPLICATION

U.S. application Ser. No. 07/516,.844 entitled "Servo Guided Stage System", filed contemporaneously herewith, by R. A. Kendall and S. Doran and assigned to the assignee of this application.

2) Related Art

Ball Joint Pivot with Dynamic Preload

Ball type pivot joints provide multiple degrees of freedom about a point at the center of a ball of spherical shape. Heretofore, ball joints have included two basic types including as follows:

1) Spring-loaded joints and
2) Spherical bearings.

Spring-loaded ball joints include a pair of cones or sockets which are tightened against the ball to eliminate backlash. A disadvantage of that system is that is that when using high preloads for high linear stiffness, there is considerable friction and wear between the ball and the cones or sockets.

The spherical bearing ball joint relies on closely matched inner and outer spherical bearing elements. This type of ball joint has high linear stiffness and low friction, but by the nature of its design must operate with a small clearance between the inner and outer bearings. Such a small clearance increases with wear and the backlash associated with this clearance makes it unsuitable for micropositioning applications.

SUMMARY OF THE INVENTION

A ball joint in accordance with this invention provides the ability to alter the preload between the cones and the ball of the ball joint dynamically to desired levels. When the stage or other device is in motion, the preload can be reduced to provide low friction and wear. When the stage or other device is not in motion, then the preload can be increased to provide zero backlash and high stiffness.

A ball-type pivot joint with dynamic preload adjustment includes a ball and a pair of cones which are dynamically preloaded by servo (feedback) control of a preload actuator. Alternate designs are limited by manufacturing and assembly tolerances as well as wear of bearing surfaces or are subject to change due to thermal fluctuations.

In accordance with this invention a ball-type pivot joint with dynamic preload adjustment is provided. A first member terminates in a ball for the joint. A pair of confronting bearing elements each includes a preferably conical bearing surface for one side of the ball. The ball is assembled between the bearing surfaces of the bearing elements. At least one of the bearing elements is connected to a preload actuator. A preload sensor is attached to at least one of the conical bearing elements. A servo control means has an input and an output, the input being connected to the output of the preload sensor, and the output being connected to the preload actuator, whereby the preload actuator is dynamically preloaded by operation of the servo control means in response to the preload sensor.

In an alternative embodiment, the bearing elements include a relatively fixed bearing element and a relatively movable element. The relatively movable element includes a pivot end and a main body end. The pivot end is secured to the fixed bearing element and the main body end including the bearing surface. The main body end is joined to the pivot end by a flexible section of the movable element. The flexible section provides flexure of the movable element between the main body end and the pivot end.

In another alternative embodiment, the pivot end of the relatively fixed bearing element is integral with the fixed bearing element and the main body end including the bearing surface.

BRIEF DESCRIPTION OF THE DRAWINGS

FIG. 1 shows a partially sectional view of a ball joint linkage with an automatically controlled actuator for preloading the ball joint.

FIG. 2 is a modification of the ball joint linkage of FIG. 1.

FIG. 3 is another embodiment of the ball joint linkage analogous to FIG. 2 but the structure for applying force to the cones and the ball in the joint is modified.

DESCRIPTION OF THE PREFERRED EMBODIMENT

Ball Joint Pivot with Dynamic Preload

A ball-type pivot joint in accordance with this invention employs dynamic preload adjustment of the ball joint. The ball joint includes a ball and a pair of cones which are dynamically preloaded by servo (feedback) control of a preload actuator. Alternate designs are limited by manufacturing and assembly tolerances as well as wear of bearing surfaces or are subject to change due to thermal fluctuations.

Ball type pivot joints provide multiple degrees of freedom about a point at the center of a ball of spherical shape. Heretofore, ball joints have included two basic types including spring loaded joints and spherical bearings.

Spring loaded ball joints include a pair of cones or sockets in which the springs press the cones or sockets against the ball to eliminate backlash. A disadvantage of that system is that is that when using high preloads for high linear stiffness, there is considerable friction and wear between the ball and the cones or sockets.

The spherical bearing ball joint relies on closely matched inner and outer spherical bearing elements. This type of ball joint has high linear stiffness and low friction, but by the nature of its design must operate with a small clearance between the inner and outer bearings. Such a small clearance increases with wear and the backlash associated with this clearance makes it unsuitable for micropositioning applications.

The joint in accordance with a preferred embodiment of this invention provides the ability to alter the preload between the cones and the ball dynamically to desired levels. This is a very significant advantage for use in micro-positioning applications such as an X-Y stepper stage. When the stage or other device is in motion, the preload can be reduced to provide low friction and wear. When the stage or other device is not in motion, then the preload can be increased to provide zero backlash and high stiffness.

Figure 1:
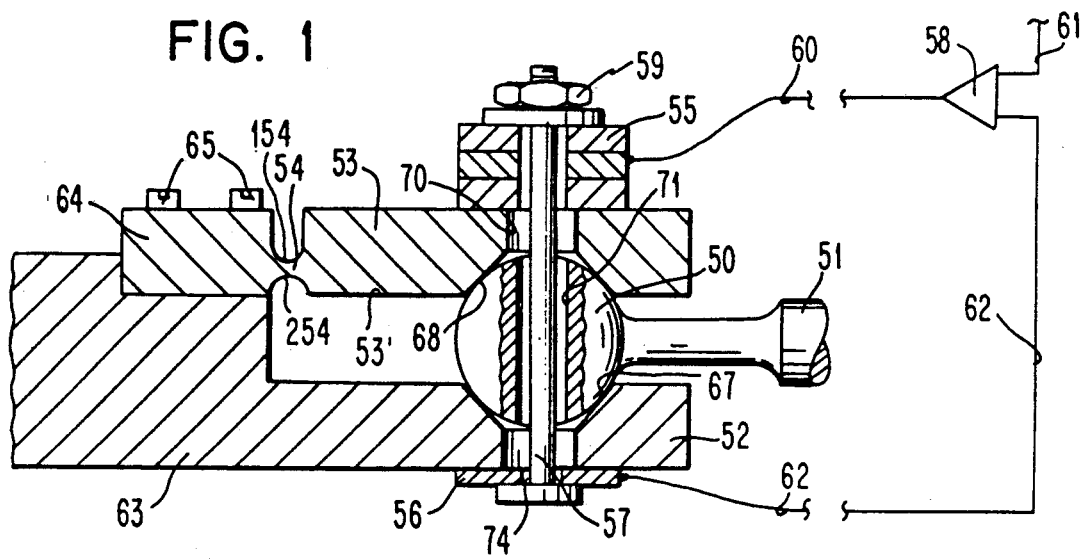
FIGS. 1, 2 and 3 show three alternative arrangements for a ball joint in accordance with this invention with conical bearings therefor for use in the linkage between one of the drivebars and the stage plate.
Figure 2:
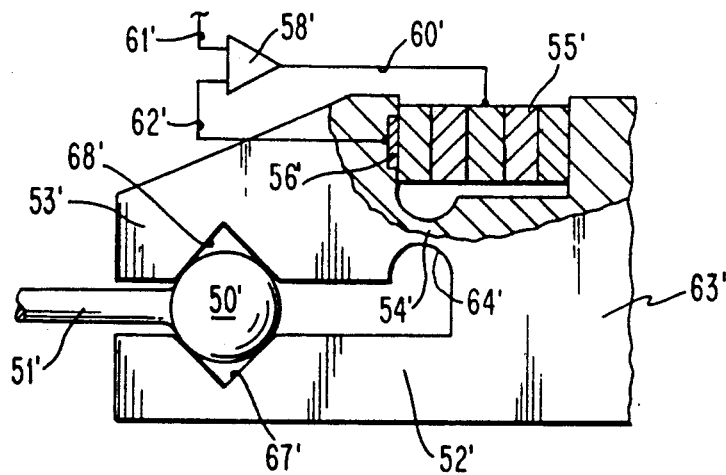
Figure 3:
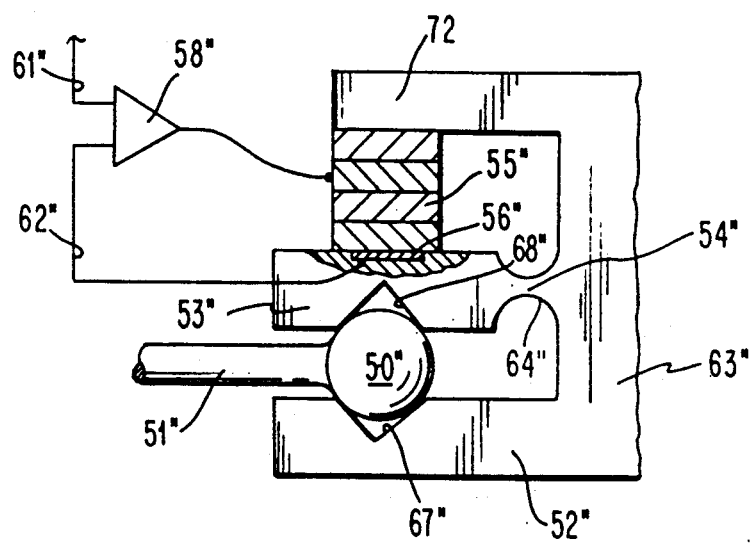

This is achieved using the arrangement depicted in FIGS. 1-3. Referring to FIG. 1, a drive rod 51 (having a round cross section at the end) with a ball end 50 is located between two cones or sockets 67 and 68 in a fixed member 52 and a preload bar 53, respectively. The cone 67, shown in the preferred embodiment in FIG. 1 as a fixed cone 67, is affixed to an object to be moved. The preload cone 68 is formed in the lower surface of preload bar 53. Preload bar 53 is connected to flange 64, i.e. pivot end 64. The opposite ends of bar 53 are the flange 64 secured to base 63 and the main body 53' which are flexibly connected together by flexure strip 54 formed between the elongated pair of transverse slots 154 and 254. In summary, flexure strip 54 provides from an elevational point of view a flexure "point" formed between body 53' and flange 64 which forms the pivot end 64 of the preload bar 53.

Flange 64 is affixed to base 63 of fixed member 52 by threaded fasteners 65. Base 63 is a mounting plate having holes therethrough for fastening to the stage plate 11 by threaded fasteners (not shown.) The flexure pivot 54 permits preload cone 68 in member 53 to be moved through a small angle about the flexure pivot 54. Preload actuator 55 is mounted so as to provide a compressive preload force acting to press down against the preload member 53 and preload cone 68. Preload actuator 55 comprises a piezoelectric or equivalent actuator such as a pneumatic, hydraulic, voice coil actuator, or the equivalent.

The compressive preload force applied to the cones 67 and 68 and to the ball 50 by using a preload tensioning rod 57 and a preload tensioning nut 59 through a hole in the center of preload actuator 55. In addition rod 57 passes through a hole 70 in preload member 53 through the center of the preload cone 68, through ball 50 and through the fixed member 52 and the center of fixed cone 67 as well as a hole 74 in the center of a preload sensor 56 comprising a strain gauge or the equivalent such as a force gauge.

Load sensor 56 is mounted so as to detect the load on the tensioning rod 57. Line 62 connects the strain gauge output into the input of the preload servo and drive electronics 58 whose output is connected to the input of the piezoelectric preload actuator 55. To increase the preload force upon the ball joint, the actuator 55 is extended or increases in thickness to compress the ball joint. To reduce the preload force, the actuator is retracted or made thinner, with the servo 58 having a predetermined level programmed into it electronically. The preload force can be altered at a frequency limited only by the bandwidth of the actuator 55. Servo 58 has another input 61 from a system controller for the purpose of setting the desired level of preload.

Although FIG. 1 shows a system using a tensioning rod 57 and a closed-loop servo system, other arrangements can be employed to provide dynamic preload adjustment forces on a ball-type pivot joint.

FIG. 2 shows a modified embodiment of this aspect of the invention where a drive rod 51' with a ball end 50' is located between two cones or sockets 67' and 68' in fixed member 52' and wedge-shaped preload lever 53'. Those two cones are shown in FIG. 2 as a fixed cone 67' formed in the upper surface of fixed member 52', which are affixed to the object to be moved and a preload cone 68'.

The preload cone 68' is an integral part of wedge-shaped lever 53' connected integrally through a flexure pivot 54' to pivot end 64' which is integral with base 63' eliminating the need for a separate 54' permits preload cone 68' in lever 53' to be moved through a small angle about the flexure pivot 54'.

Preload actuator 55' is mounted so as to provide a preload force acting to press laterally against the preload lever 53' which drives preload cone 68' down against ball end 50'. The compressive preload is achieved without using a preload tensioning rod and nut 59 since wedge-shaped lever 53' is integral with fixed member 52'. Preload sensor 56' is mounted so as to detect the load on the wedge-shaped lever 53' from actuator 55'. Line 62' connects the electrical output from strain gauge 56' into the input of the preload servo and drive electronics 58' whose electrical output signal is connected to the input of the piezoelectric preload actuator 55'.

To increase the preload force upon the ball joint, the actuator 55' is extended or increases in thickness and to reduce the preload force, the actuator is retracted or made thinner, with the servo 58' having a predetermined level programmed into it electronically. The preload force can be altered at a frequency limited only by the bandwidth of the actuator 55'. Servo 58' has another input 61' from a system controller for the purpose of setting the desired level of preload.

FIG. 3 shows another embodiment analogous to FIG. 2 where like elements have like functions, but the structure for applying force to the cones and the ball is modified.

In this embodiment drive rod 51" has a ball end 50" located between two cones or sockets 67" and 68" in fixed member 52" and preload lever 53", respectively. Fixed cone 67" is formed in the upper surface of fixed member 52" which is affixed to the object to be moved. Preload cone 68" is formed in the lower surface of preload bar 53" connected integrally through a flexure pivot 54" to pivot end 64" which is integral with base 63' eliminating the need for a separate preload bar secured to the base 63". The flexure pivot 54" permits preload cone 68" in member 53" to be moved through a small angle about the flexure pivot 54".

Mounted so as to provide a compressive preload force acting to press down against the preload member 53" and preload cone 68" is a preload actuator 55". The compressive preload is achieved using a preload tensioning arm 72 integral with base 63". Preload sensor 56" is mounted so as to detect the load on the bar 53" from actuator 55".

Line 62" connects the electrical output from strain gauge 56" into the input of the preload servo and drive electronics 58" whose electrical output signal is connected to the input of the piezoelectric preload actuator 55". To increase the preload force upon the bearing, the actuator 55" is extended or increases in thickness and to reduce the preload force, the actuator is retracted or made thinner, with the servo 58" having a predetermined level programmed into it electronically. The preload force can be altered at a frequency limited only by the bandwidth of the actuator 55". Servo 58" has another input 61" from a system controller for the purpose of setting the desired level of preload.

INDUSTRIAL APPLICABILITY

This bearing is suitable for use in highly precise x-y positioning systems. In particular, it is suitable for use in such positioning systems used by manufacturers and users of E-beam systems or similar kinds of systems in the semiconductor manufacturing industry. This bearing system is designed for use with an E-Beam system employed for exposure of lithographic masks for use for semiconductor manufacturing. These drive tables provide improved manufacturing tolerances well below those possible or required in the past.

What is claimed is:

1. A ball-type pivot joint with dynamic preload adjustment comprising
   a) a first member terminating in a ball for said joint,
   b) a pair of confronting bearing elements each including a bearing surface for one side of said ball, said ball being assembled between said bearing surfaces of said bearing elements,
   c) at least one of said bearing elements being connected to a preload actuator,
   d) a preload sensor attached to at least one of said bearing elements,
   e) servo control means having an input and an output, said input being connected to the output of said preload sensor, and said output being connected to said preload actuator,
   whereby said preload actuator is dynamically preloaded by operation of said servo control means in response to said preload sensor.

2. A ball-type pivot joint in accordance with claim 1 wherein
   said bearing surfaces are conical.

3. A ball-type pivot joint in accordance with claim 1 with
   said bearing elements including a relatively fixed bearing element and a relatively movable element,
   said relatively movable element including a pivot end, said pivot end being secured to said fixed bearing element and a main body end including said bearing surface, said main body end being joined to said pivot end by a flexible section of said movable element, said flexible section providing flexure of said movable element between said main body end and said pivot end.

4. A ball-type pivot joint in accordance with claim 3 wherein
   said bearing surfaces are conical.

5. A ball-type pivot joint in accordance with claim 1 with
   said bearing elements including a relatively fixed bearing element and a relatively movable element,
   said relatively movable element including a pivot end, said pivot end being integral with said fixed bearing element and a main body end including said bearing surface,
   said main body end being joined to said pivot end by a flexible section of said movable element,
   said flexible section providing flexure of said movable element between said main body end and said pivot end.

6. A ball-type pivot joint in accordance with claim 5 wherein
   said bearing surfaces are conical.

* * * * *